(12) United States Patent
Nickels

(10) Patent No.: US 6,290,173 B1
(45) Date of Patent: Sep. 18, 2001

(54) AIRCRAFT CRACKED STACK PREVENTION APPARATUS AND METHOD

(75) Inventor: Norris K. Nickels, Scottsdale, AZ (US)

(73) Assignee: Commuter Air Technology, Inc., Scottsdale, AZ (US)

( * ) Notice: Subject to any disclaimer, the term of this patent is extended or adjusted under 35 U.S.C. 154(b) by 0 days.

(21) Appl. No.: 09/429,690

(22) Filed: Oct. 28, 1999

(51) Int. Cl.$^7$ .................................................. B64D 33/04
(52) U.S. Cl. .................................. 244/53 R; 244/129.1; 60/322
(58) Field of Search ..................... 244/54, 53 R, 244/129.1; 138/122, 173, 125, 131–139; 285/45, 114, 223–231, 299, 236; 60/322

(56) References Cited

U.S. PATENT DOCUMENTS

| | | |
|---|---|---|
| 3,738,394 | 6/1973 | Westerbarkey . |
| 4,792,161 | 12/1988 | Usui . |
| 4,867,269 | 9/1989 | Lalikos et al. . |
| 5,145,215 | 9/1992 | Udell . |
| 5,340,165 | 8/1994 | Sheppard . |
| 5,784,881 | 7/1998 | Otsuko et al. . |
| 5,882,046 | 3/1999 | Thomas . |

FOREIGN PATENT DOCUMENTS

| | | | |
|---|---|---|---|
| 627120 | 7/1949 | (GB) . | |
| 1049688 | * 11/1966 | (GB) | ................................. 244/53 R |
| 2230833 | 10/1990 | (GB) . | |
| 2278901 | 12/1994 | (GB) . | |
| 5-86855 | 4/1993 | (JP) . | |
| 6-221482 | 8/1994 | (JP) . | |

* cited by examiner

*Primary Examiner*—Galen L. Barefoot
(74) *Attorney, Agent, or Firm*—Donald J. Lisa

(57) ABSTRACT

A bellows body is curved and formed with a plurality of convolutions to allow axial and lateral flexure of both ends of the bellows when connected between the engine exhaust stack and an airframe duct. The upper slotted end of the bellows fits over the stack nipple and is conventionally, fixedly sealingly secured thereto by an O-clamp. The outside diameter of the lower end forms a gas tight slip joint in the bore of the lower cowling heater duct flange. For added reinforcement an optional collar may be permanently fitted exteriorly and/or interiorly of the stack wall adjacent the stack nipple and an optional brace may be welded interiorly between the stack and scupper.

20 Claims, 14 Drawing Sheets

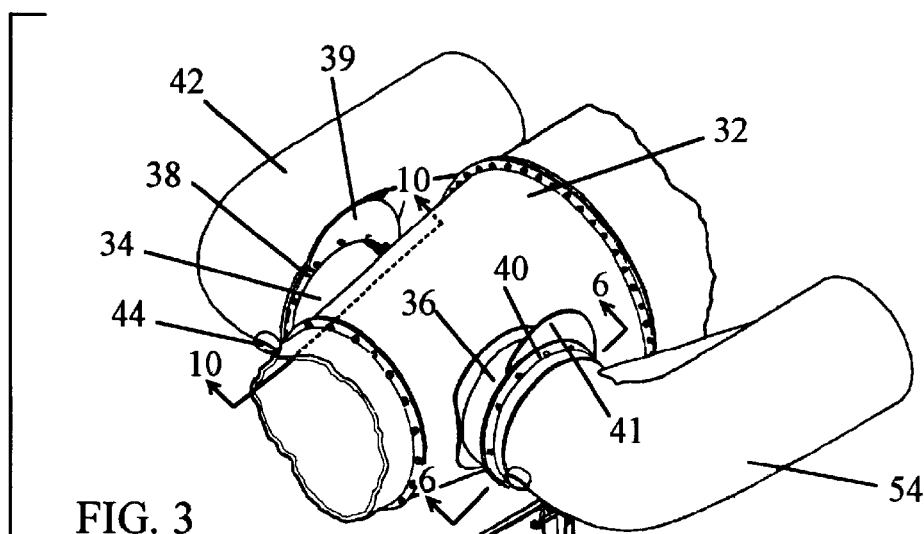
FIG. 3
PRIOR ART
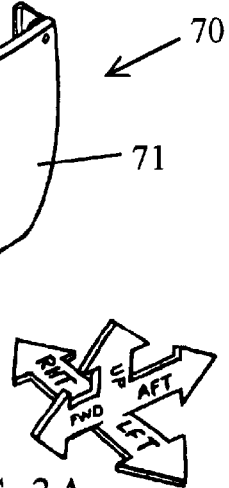
FIG. 3A
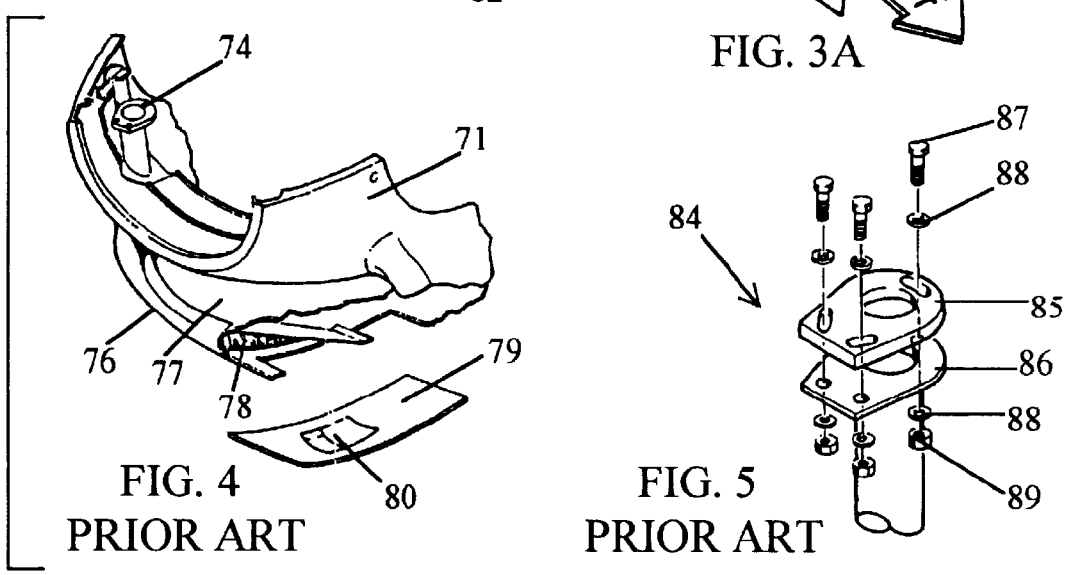
FIG. 4
PRIOR ART
FIG. 5
PRIOR ART

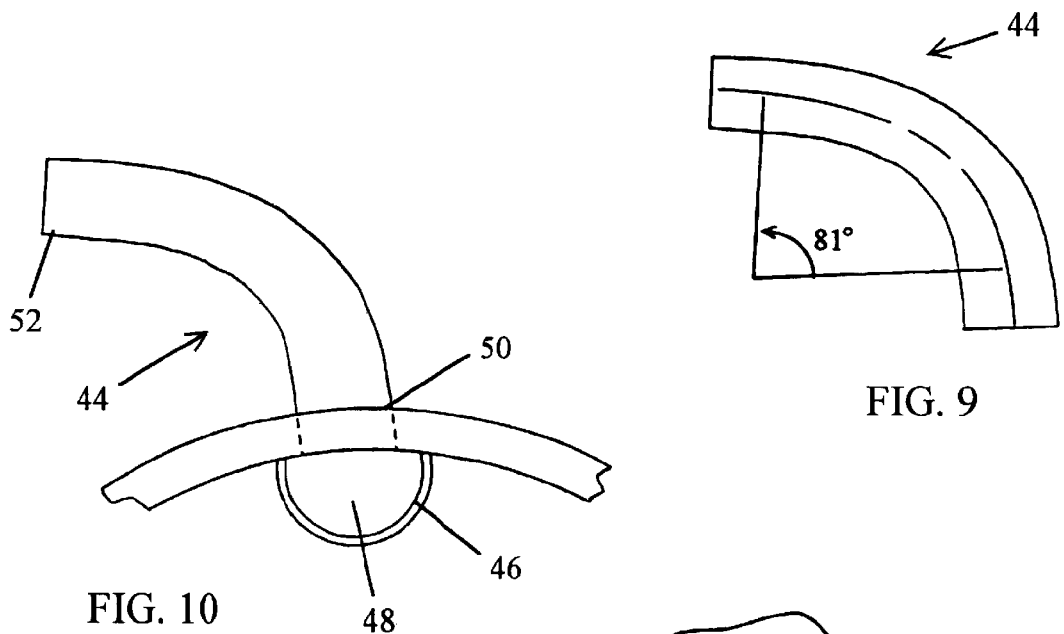
FIG. 9
FIG. 10
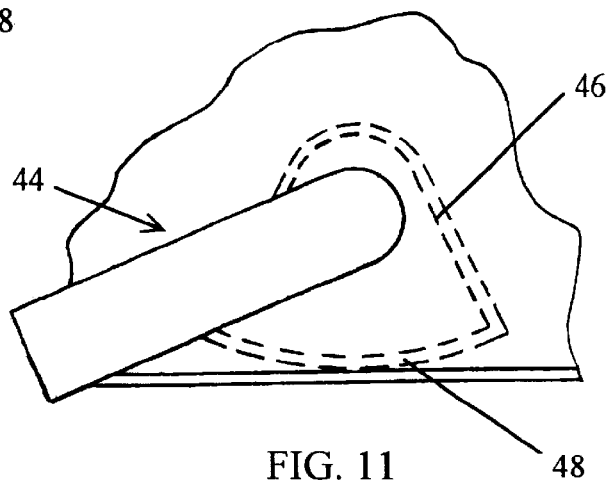
FIG. 11
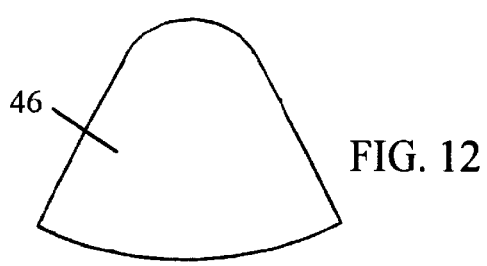
FIG. 12

70

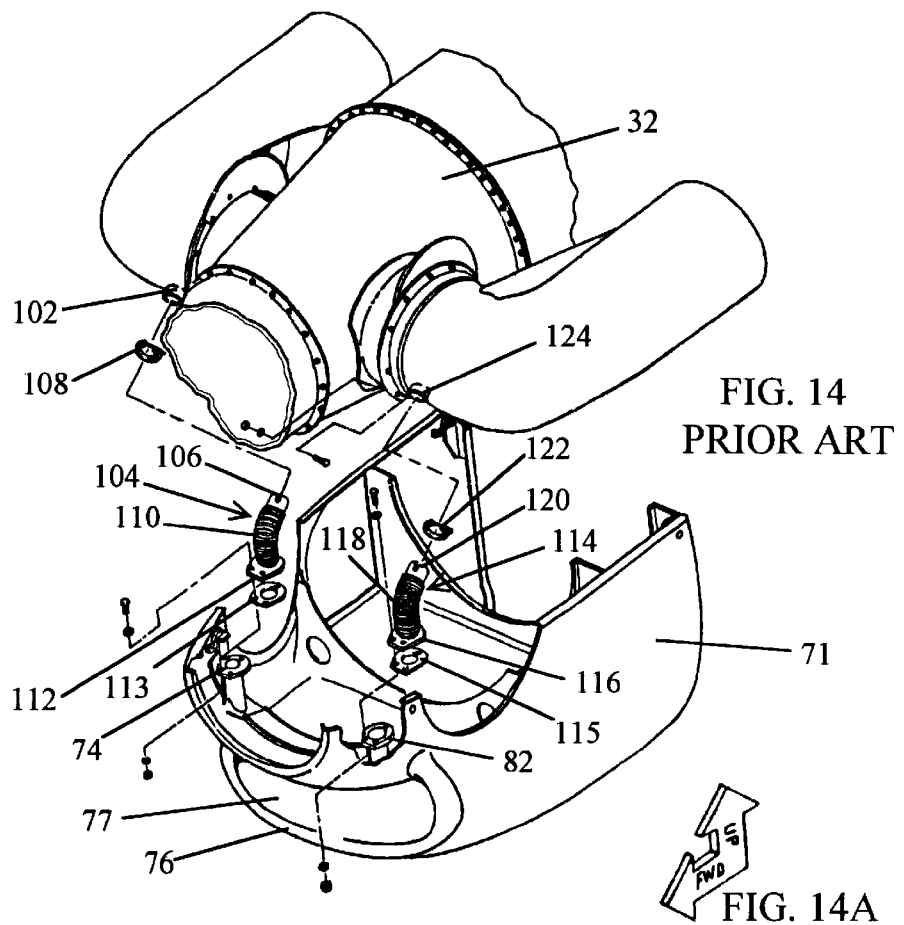
FIG. 14
PRIOR ART
FIG. 14A
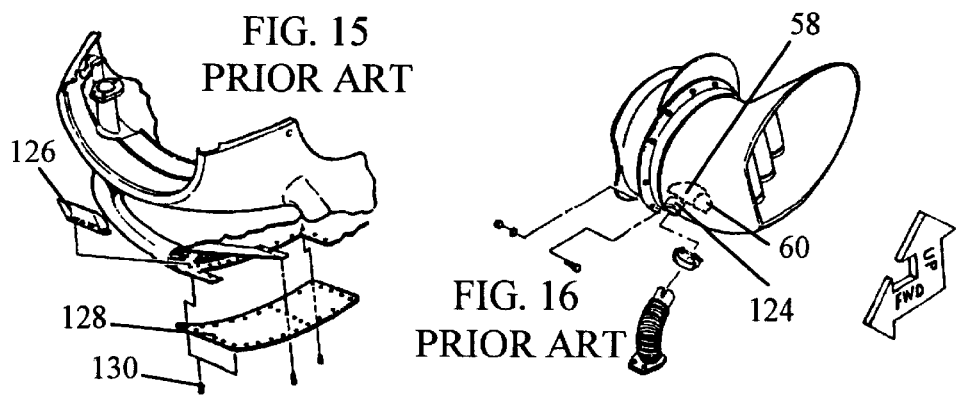
FIG. 15
PRIOR ART
FIG. 16
PRIOR ART

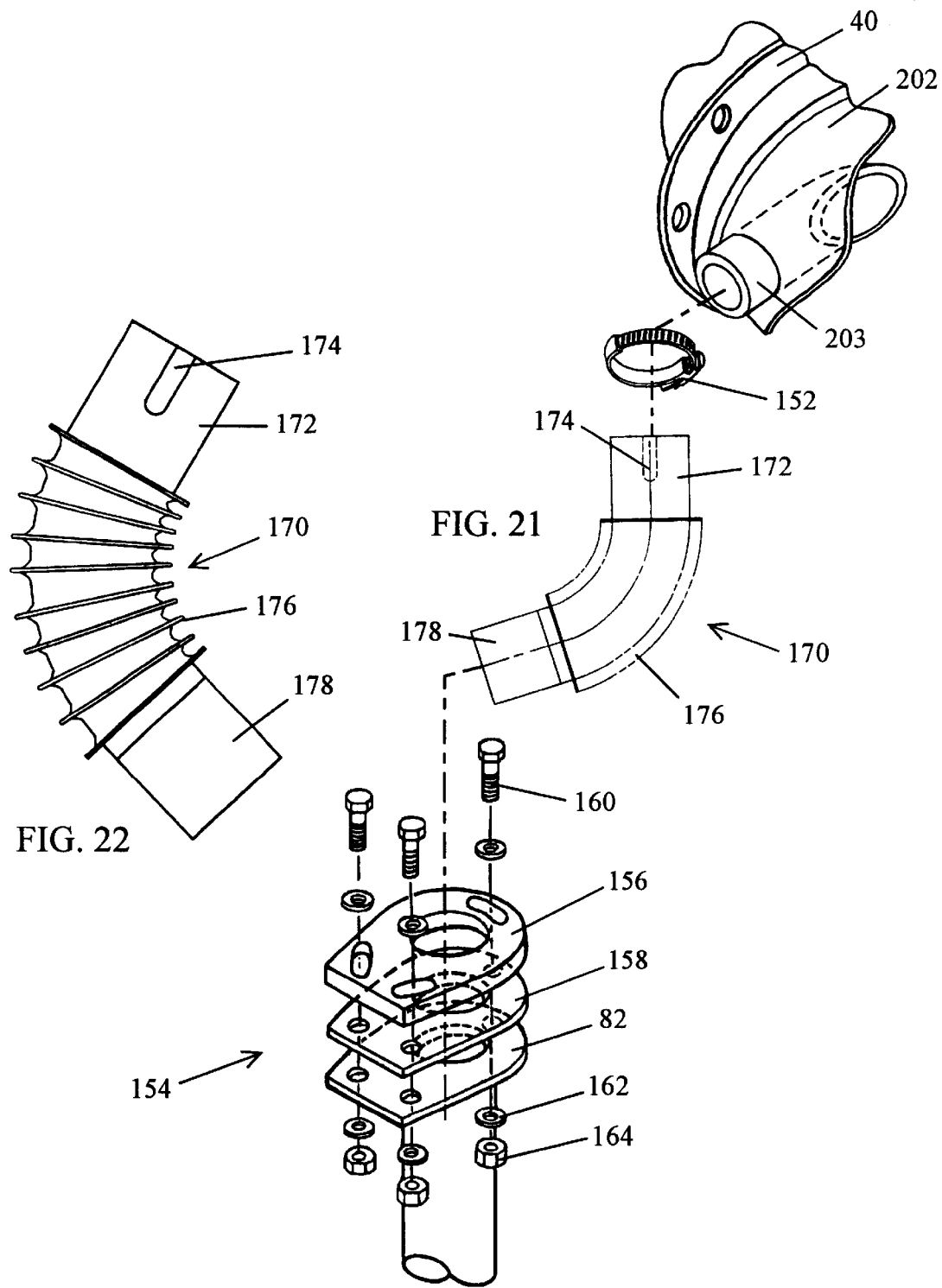

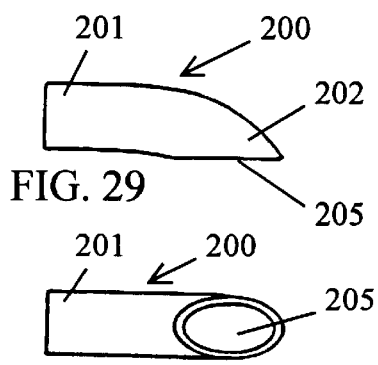
FIG. 29
FIG. 30
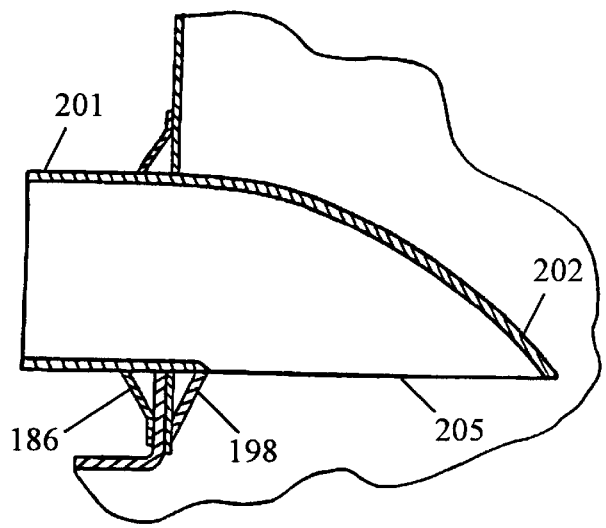
FIG. 31
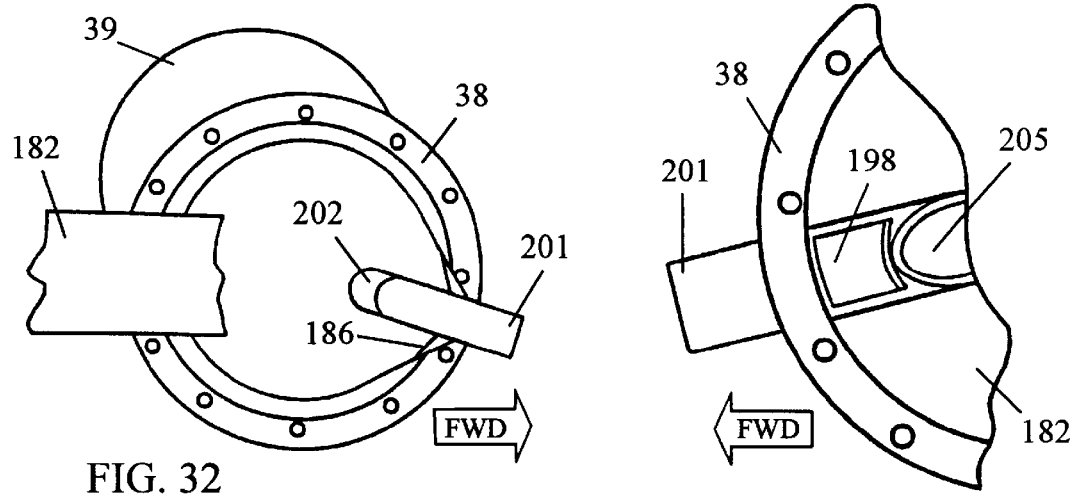
FIG. 32
FIG. 33
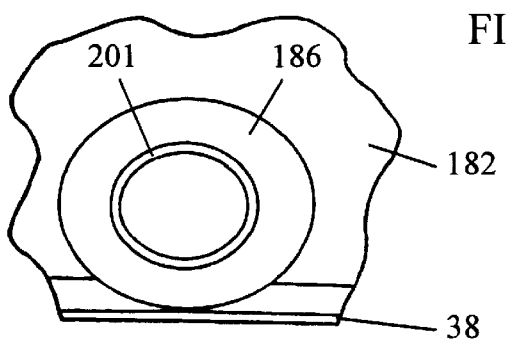
FIG. 34

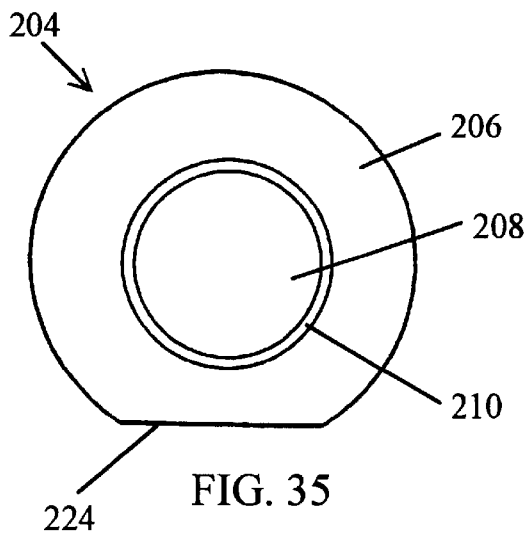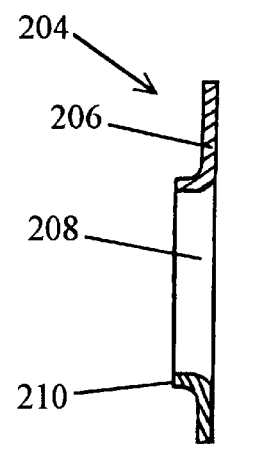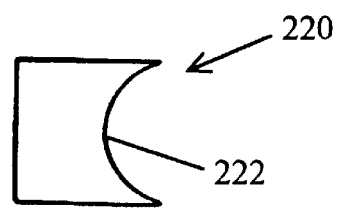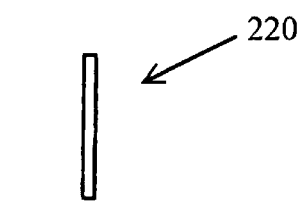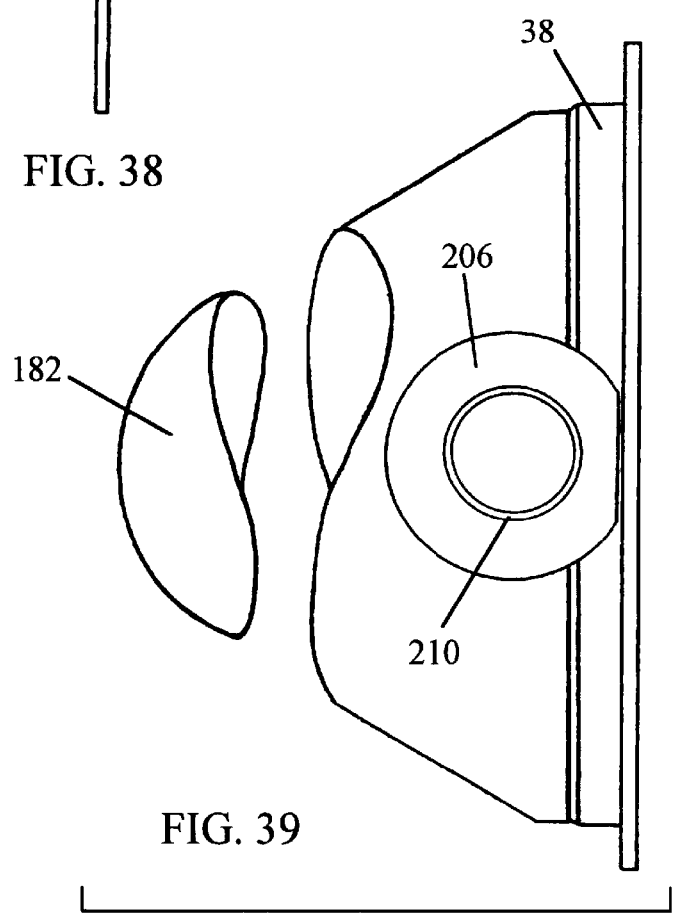
FIG. 35
FIG. 36
FIG. 37
FIG. 38
FIG. 39

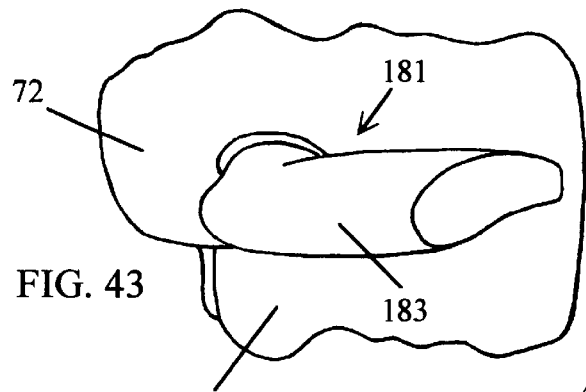
FIG. 43
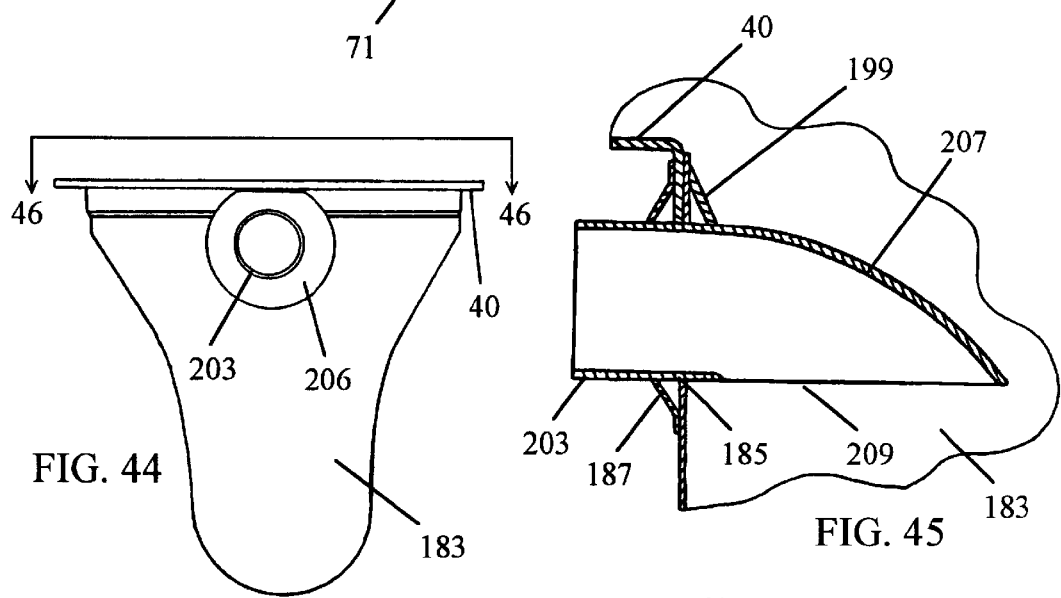
FIG. 44
FIG. 45
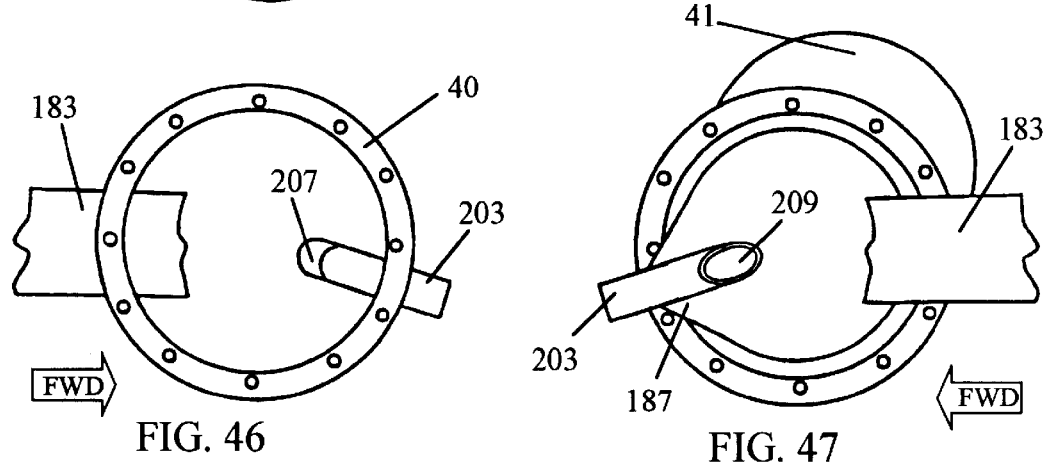
FIG. 46
FIG. 47

AIRCRAFT CRACKED STACK PREVENTION APPARATUS AND METHOD

CROSS-REFERENCES TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Fields of the Invention

The present invention relates generally to apparatuses and methods of preventing cracks and leaks in engine exhaust systems in vehicles, and, more particularly, to a bellows assembly for preventing cracks in the exhaust stack or shroud of an aircraft.

2. Discussion of Background and Prior Art

Shown in FIGS. 1, 2 is a small passenger aircraft 10 with dual turbo-prop engines 11, 12, such as the King Air 200 and B200 family of aircraft made by Raytheon. A typical turbo-prop engine 20 receives outside air in an air inlet 21 leading to a 3-stage axial flow compressor 22 which sends compressed air to a centrifugal compressor 23. The highly compressed air is then mixed with fuel and burned in the combustion chamber 24 the exhaust gases from which are accelerated through the nozzles of a compressor turbine 24 and then are finally expanded through the nozzles of a free power turbine 26 which drives a high speed shaft 27 which, after reduction of the shaft rpm in a gear box 28, drives the propeller shaft 29 and propeller, while the spent gases are exhausted through exhaust outlets 30 to the engine exhaust stacks 42, 54 (FIG. 3).

Most OEM aircraft in the King Air 200 class come with an air inlet anti ice system, and the King Air 200 is no exception. In a typical aircraft, the original inlet anti-ice system included a pair of pick up tubes 44 (FIGS. 7, 8), one each (right and left, relative to the nose of the aircraft looking forward) connected between an exhaust stack 42, 54 adjacent the engine nacelle 32 and an air frame heater duct 74, 82 in the lower engine cowling 71. Each pick up tube 44 (FIGS. 7–12) is bent about 80° (FIG. 9), has an upper end 50, 66 welded around a hole in the stack wall and is fluidly coupled to a scupper portion 46, 58 mounted inside the stack 42, 54, the open end 48, 60 of which faces upstream relative to the exiting exhaust gases, thereby receiving and directing some exhaust gas forwardly through the elongated portion 45, 64 of each tube 44 through the lower end 52, 68 of the tube which is slip joint 84 fastened 87, 88, 89 via donut 85 and duct flange 86 (FIG. 5) to the airframe ducts 74, 82. Ducts 74, 82 are part of the inlet 77 anti-ice system of each engine and direct the hot exhaust gases through ducts 76 which terminate at splitter vanes 78 which dump the spent exhaust gases to the atmosphere through the opening 80 in exhaust outlet plate 79 in the airframe skin at the bottom of the lower cowling 71.

One problem with this design is that soot accumulated on the lower surface of the cowling and the underside of the wing. Accordingly, it is an object of the present invention to provide an inlet anti-icing system that eliminates the accumulation of exhaust gas soot inside the cowling and on the exterior skin of the aircraft.

Another problem with this original design was the possibility of exhaust stack cracking. Significant engine vibrations in the X, Y and Z directions, such as during start-up, shut-down, taxiing, take-off, landing, rapid throttle movements, turbulent air conditions, certain sustained engine operating conditions, and the like, and also as a result of repeated expansion and contraction resulting from the combination of extreme weather and operational temperature conditions, place a large amount of stress on the welded connection between the elongated pick up tubes 44 and the stack 42, 54 walls at the point of attachment. This stress has resulted in the cracking of the pick up tube to stack welded connection allowing further hot exhaust gases and soot to escape into the space between the exterior wall of the stack and the engine cowling creating a potential fire hazard and a dirty, unsightly appearance throughout the entire main engine compartments.

Accordingly it is a further object of the present invention to provide an inlet a anti-icing system that eliminates the cracking of exhaust stacks and associated couplings and the further accumulation of exhaust gas soot inside the entire engine cowling and main engine compartments.

A subsequent prior art system has only partially solved the above described problems. As shown in FIG. 13, this prior system modifies the inlet 77 anti-ice system to make it a flow through system in which exiting exhaust gases are picked up on the right side, as in the prior system, but are directed through the hot lip duct in one direction to the left side of the engine where they exit to atmosphere through the left exhaust stack, requiring modifications to the left side scupper, both pick up tubes and the lower cowling discharge area. The modifications made by this prior art system are shown in FIGS. 13–20, as explained in greater detail below.

In the modified prior art flow through inlet anti-ice system, the pick up tubes 44 are replaced by a pick up nipple 102 on the right side and exit nipple 124 on the left side. The right scupper 48 remains with its opening facing upstream creating a positive inlet pressure at that end of the system, while the left scupper 58 open face 60 is reversed to point downstream relative to the exhaust gases creating a suction at that end of the system. (FIGS. 16–20). The splitter vanes 78 in the hot lip are removed and blocker dams 126 are installed blocking the old exhaust outlets, leaving duct 76 as a single continuous sealed duct. Cover plate 128 replaces the prior plate 79 completely sealing the lower cowling area from the exhaust gases. Hose assemblies 104, 114 replace pick up tubes 44. Each hose assembly 104, 114 includes a curved tube having a slot 106, 120 in one end that fits over and is clamped 108, 122 to the stack nipple 102, 124 and a flange 112, 116 at the lower end that is fixedly bolted to a gasketed 113,115 airframe duct flange 74, 82.

To relieve stress in the rigid connections between the engine, stack, nipple, hose and heater duct, the central portion of each hose body is roughly bent at about 70° and is formed with a plurality of outwardly extending convolutions 110, 118 which allow the body to flex like a bellows and dampen the engine vibrations previously described. However, in practice while the above solution has relieved the lower cowling problem, the main engine compartment problem previously described has not been solved because the flex in the bellows body itself has been proven to be insufficient to prevent the continued cracking at the nipple-stack welded joints due to the oftentimes severe engine movements in the X, Y, and Z directions. Accordingly, as previously stated, it is an object of the present invention to prevent the cracking of the stacks due to such engine movements.

In view of the failed prior attempts there is a long felt need for and it is an object of the present invention to provide a satisfactory hot inlet lip anti-ice system for small twin turboprop aircraft.

BRIEF SUMMARY OF THE INVENTION

Set forth below is a brief summary of the invention which achieves the foregoing and other objects and provides the foregoing and hereafter stated benefits and advantages in accordance with the structure, function and results of the present invention as embodied and broadly described herein. Applicant's invention includes independently both the apparatus and the methods described herein which achieve the objects and benefits of the present invention. Both formats of the invention are described below and claimed below, and it is applicant's intention to claim both formats even though from time to time below for purposes of clarity and brevity applicant will use either one or the other format to describe various aspects and features of the invention.

One aspect of the invention is in the method of preventing cracks in an aircraft engine stack at or near the stack nipple and scupper which includes the steps of forming a curved cylindrical tube with straight ends; radially outwardly convoluting the central portion of the tube to allow axial and lateral flexure of each end relative to a longitudinal axis of the body; rigidly, sealingly, externally coupling the upper slotted end along one longitudinal axis of the tube over the outside of the engine exhaust stack nipple; and, slidingly, sealingly, internally coupling a straight, smooth cylindrical surface portion of the lower end along another longitudinal axis of the tube to the inside of an airframe duct portion.

Further features of this aspect of the invention include the steps of permanently attaching a collar to an engine stack wall adjacent the point of coupling to the one end of the tube for reinforcing the structural integrity of the wall for further preventing cracking at that location of the stack; and, bracing the attachment point internally between the stack wall and a tubular portion of the stack nipple which extends into the interior of the stack.

Another aspect of the invention is in an aircraft hose assembly for preventing cracks in the engine stack having a curved tube with straight ends and a plurality of radially extending convolutions which allow axial and lateral flexure of each end relative to a longitudinal axis of the body, one end adapted for forming a gas tight, rigid coupling to an engine exhaust stack nipple, and the other end having a straight, smooth cylindrical surface along one longitudinal axis of the tube for forming a gas tight, slip joint coupling to a cowling duct.

Further features of this aspect of the invention include the upper end of the tube has a slot extending from the upper edge of the one end axially along another longitudinal axis of the body and an inside diameter larger than a nipple portion of the stack with the two longitudinal axes forming an angle of about 70°.

Further features of this aspect of the invention include a clamp for fastening the upper end to the stack nipple, and a donut fastener and gasket having a central bore for slidingly receiving and sealingly securing the lower end to the cowling duct.

Still further features of this aspect of the invention include a stack tube mounted in a stack wall having at one end the nipple extending from the stack wall for coupling to the one end of the hose assembly and a scupper at the other end for intaking or exhausting engine exhaust gas. In a complete system or kit there is provision for two identical stack tubes, one having a scupper face positionable inside the stack for intaking exhaust gas from the engine for delivery through the one stack tube to an airframe duct inlet for secondary use, such as, in a flow through engine inlet lip anti-ice system, and the other having a scupper face positionable inside the stack for receiving the exhaust gas from an airframe duct exit through the other stack tube for delivery to the atmosphere.

Still further features of this aspect of the invention include a ring-shaped collar with an axially extending lip adjacent the central bore for receiving the stack tube therethrough and adapted for permanent attachment to an engine stack wall adjacent the point of coupling to the one end of the hose assembly tube for reinforcing the structural integrity of the stack wall for further preventing cracking at that location of the stack and having an annular body portion contoured to fit either or both of the exterior and/or interior surfaces of a stack wall at the point of attachment depending on the placement location of the collar; and, a brace plate positionable between the stack and the scupper for strengthening the attachment of the one end of the hose body to the stack.

BRIEF DESCRIPTION OF THE SEVERAL VIEWS DRAWINGS

FIG. 3 is a partial exploded perspective view of a portion of the left (port) engine cowling showing the engine nacelle and stacks of a first embodiment of the prior art aircraft of FIG. 1.

FIG. 3A is a perspective view of arrows showing the orientation of the FIG. 3 view relative to the aircraft of FIG. 1.

FIG. 4 is a partial exploded perspective view of a portion of the lower cowling of FIG. 3.

FIG. 5 is a partial exploded perspective view of a portion of the heater duct assembly slip joints of FIG. 3.

FIG. 9 is a side elevation view one of the elongated pick up tubes of FIG. 3.

FIG. 10 is a view taken along the line 10—10 of FIG. 3 showing the elongated pick up tube one of the elongated pick up tubes of FIG. 3 and the scupper facing upstream of the exhaust gas.

FIG. 11 is a front elevation view of FIG. 7 showing the right stack, flange, pick up tube and scupper.

FIG. 12 is a plan view of the scupper.

FIG. 14 is a partial exploded perspective view of a portion of the left (port) engine cowling showing the engine nacelle, stacks, and bellows assemblies of the second embodiment (FIG. 13) of the prior art aircraft of FIG. 1.

FIG. 14A is a perspective view of arrows similar to FIG. 3A.

FIG. 15 is a a partial exploded perspective view of a portion of the modified lower cowling of FIG. 14.

FIG. 16 is a a partial exploded perspective view of a portion of the bellows assembly, the left modified exit tube, and the modified left scupper, of FIG. 14.

FIG. 21 is a partial exploded perspective view of the improved bellows assembly of the present invention with the bellows body shown schematically in left side elevation.

FIG. 22 is a view similar to FIG. 21 showing in right side elevation only the improved bellows body of the present invention.

FIG. 29 is a top elevation view of the modified pick up or exit tube, with integral scupper, of the present invention.

FIG. 30 is a side elevation view of FIG. 29.

FIG. 31 is a partial top section view of the right pick up tube, scupper, externally mounted collar, stack and brace of FIGS. 22–30.

FIG. 32 is a partial side section elevation of FIGS. 23, 31.

FIG. 33 is the rear view of FIG. 32.

FIG. 34 is the left side view of FIG. 31.

FIG. 35 is a front elevation view of the a second embodiment of the collar of the present invention.

FIG. 36 is a side elevation view of FIG. 35.

FIG. 37 is a front elevation view of a second first embodiment of the brace of the present invention.

FIG. 38 is a side elevation view of FIG. 37.

FIG. 39 is a partial front elevation view of the right exhaust flange, stack shroud, and pick up tube, and the collar of FIG. 35.

FIG. 43 is a partial perspective view of the left exhaust gas extractor of the present invention.

FIG. 44 is a view similar to FIG. 39 except showing the left flange, stack shroud, and pick up tube, and the collar of FIG. 35.

FIG. 45 is a view similar to FIG. 31 except showing the collar and brace of FIGS. 25–28.

FIG. 46 is a partial side elevation taken along the line 46—46 of FIG. 45 showing the shroud, flange and exit tube of FIG. 43, 44.

FIG. 47 is the rear view of FIG. 46.

DETAILED DESCRIPTION OF THE INVENTION

Figure 1:
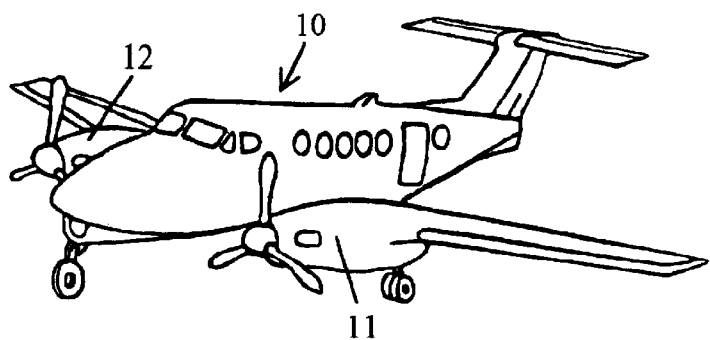
FIG. 1 is a perspective view of one type of vehicular application of the present invention, namely, the Beechcraft King Air 200/B200 family of twin turbo-prop aircraft.
Figure 2:
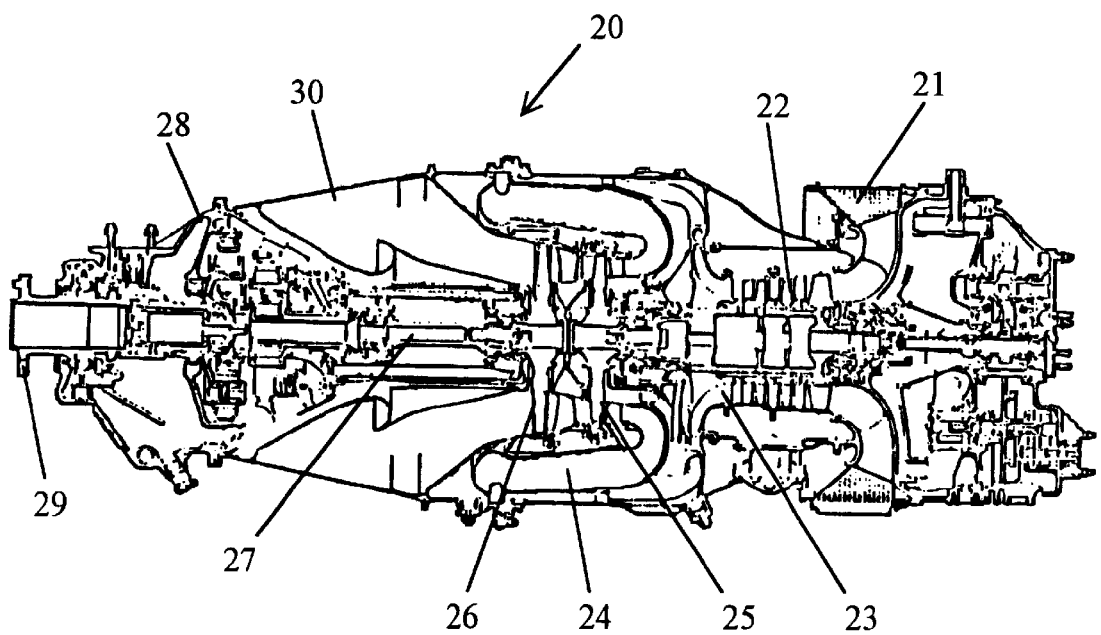
FIG. 2 is a top elevation view of the port turbo-prop engine of FIG. 1 as seen from inside the engine nacelle.
Figure 6:
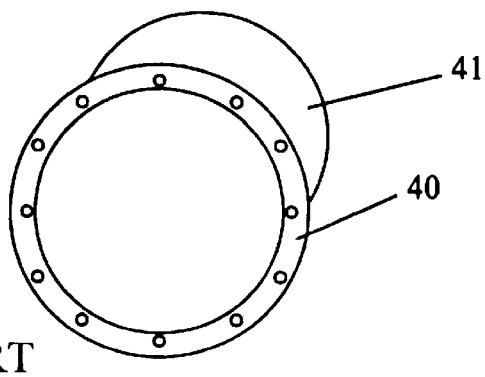
FIG. 6 is a front elevation taken along the line 6—6 of FIG. 3 showing the stack flange and fire detector light shield.
Figure 7:
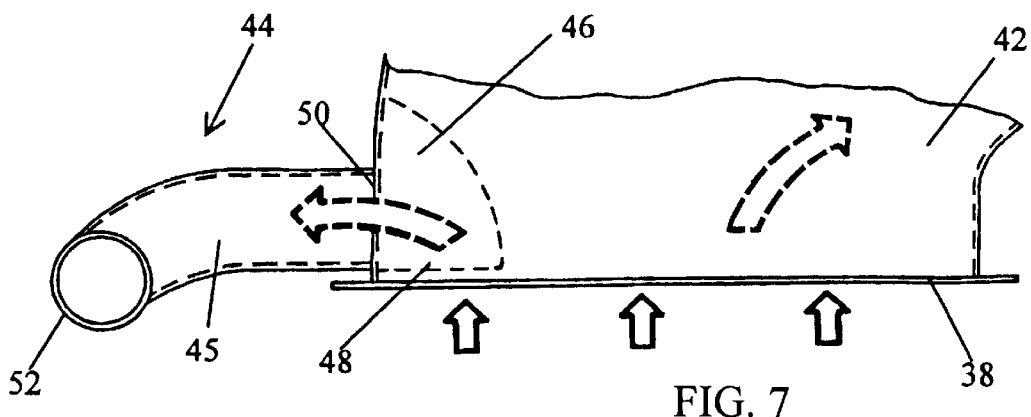
FIG. 7 is a partial top elevation of the right (inboard) stack, stack flange, scupper and elongated pick up tube of FIG. 3.
Figure 8:
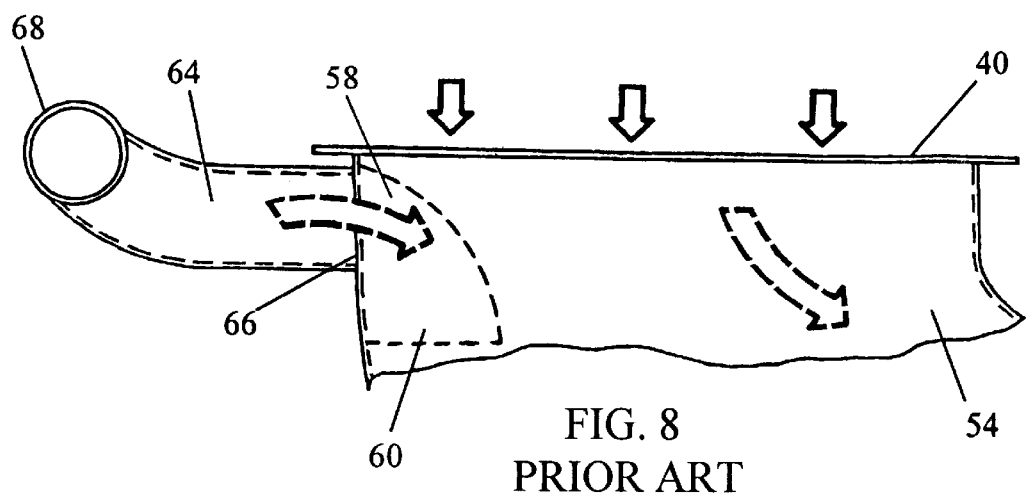
FIG. 8 is a partial top elevation of the left (outboard) stack, stack flange, scupper and elongated pick up tube of FIG. 3.
Figure 13:
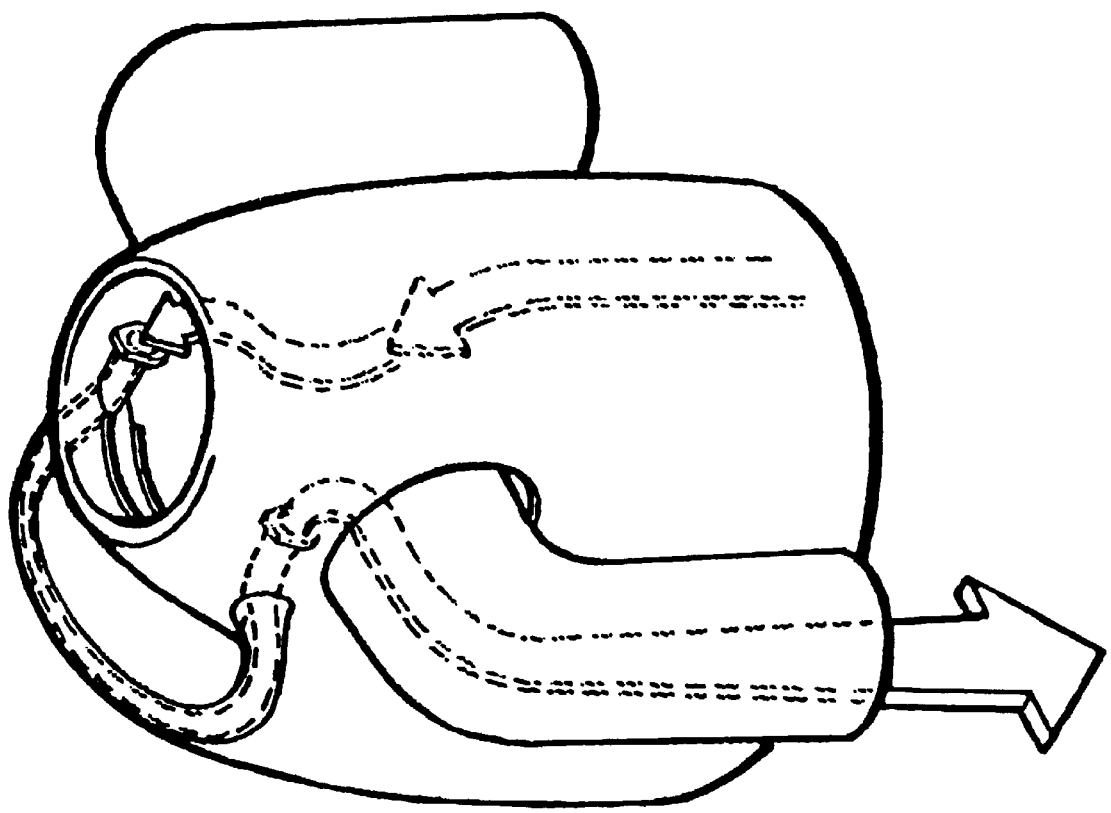
FIG. 13 is a schematic perspective view of a second embodiment of the prior art aircraft of FIG. 1 showing an improved flow through inlet anti-ice system of the prior art.
Figure 17:
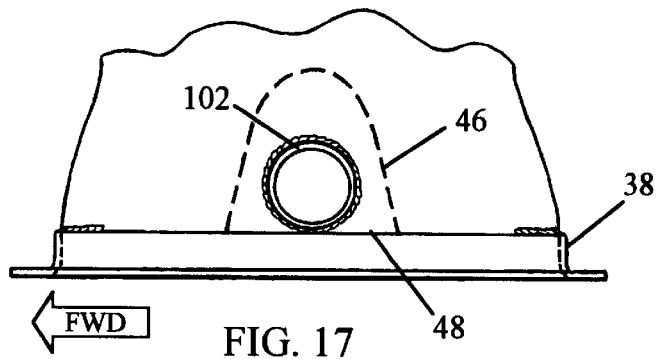
FIG. 17 is a partial front elevation view of the right stack showing the right modified pick up tube and scupper of FIG. 16.
Figure 18:
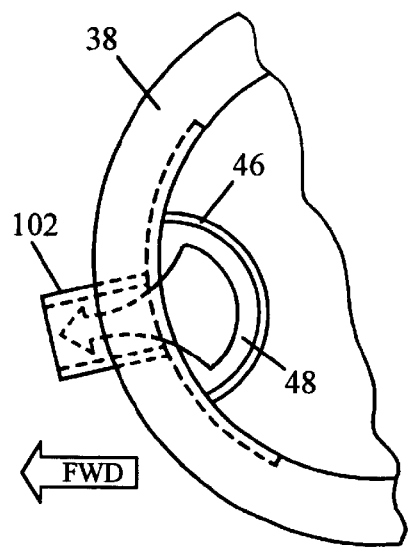
FIG. 18 is a view similar to FIG. 10 showing the right modified pick up tube and scupper of FIGS. 14, 17.
Figure 19:
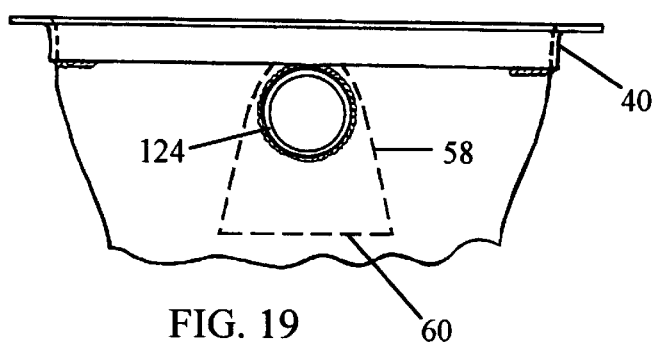
FIG. 19 is a partial front elevation view similar to FIG. 17 except showing the left modified pick up tube and scupper of FIG. 16.
Figure 20:
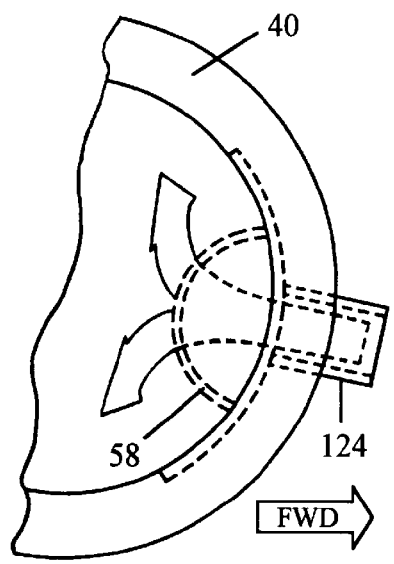
FIG. 20 is a view similar to FIG. 10 except showing the left modified pick up tube and scupper of FIGS. 16, 19.
Figure 23:
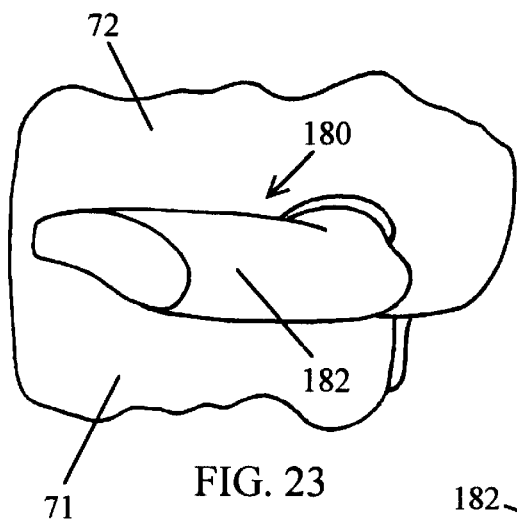
FIG. 23 is a partial perspective view of the right exhaust gas extractor of the present invention.
Figure 24:
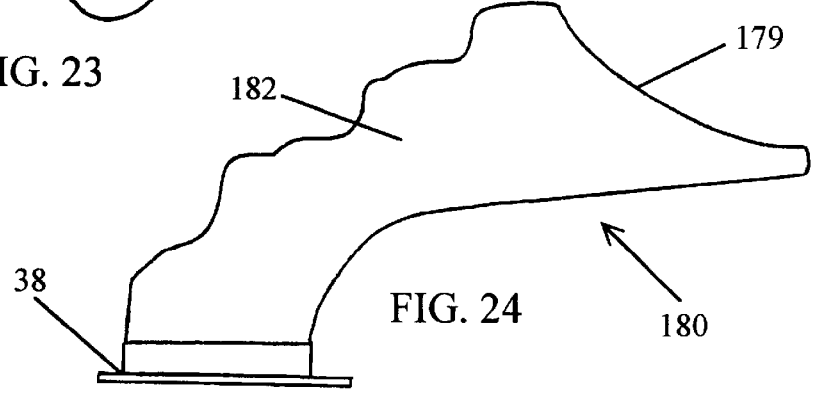
FIG. 24 is a partial top plan view of the right exhaust gas extractor of FIG. 23.

The preferred embodiments of the present invention and the best modes lo known to the inventor are shown in FIGS. 22–50.

The Hose

Shown in FIG. 22 schematically and in exploded perspective are the components of a complete assembly of the present invention which include slip joint 154, hose 170 having lower tubular end 178 and upper end 172, clamp 152, and exit tube 203 with scupper 202. The right hose assembly and related components are identical to the left components except as described below and shown in the drawings. Only the left hose 170 is shown in FIG. 22 for brevity purposes.

As shown in FIG. 22, the left hose is a tube 170 which is curved about 70° with its central portion formed with a plurality of radially extending convolutions 176 which allow axial and lateral flexure of each end relative to a longitudinal axis of the body 170.

The upper end 172 is straight, has a slot extending from the upper edge of the one end axially along one longitudinal axis of the body and has an inside diameter slightly larger than the outside diameter of exit tube portion 203. A conventional clamp 152 fastens the upper end 172 to the stack exit tube 203. The slot allows for compressing the upper end to close the gap and form a gas tight seal as further described below.

The lower end 178 has a smooth, straight, cylindrical surface along another longitudinal axis of the tube and is slightly longer than the upper end 172 with an outside diameter slightly smaller than the inside diameter of the lower cowling ducts 74, 82 so that it can extend well down into and is able to slide within the bore of the donut 156, gasket 158, and duct flange 82 without coming out during the maximum contemplated engine movements in the X, Y, or Z directions. The two longitudinal axes of the hoses 170 form an angle of about 70° therebetween.

Gas Tight Seals

During assembly a gas tight seal is formed at the upper 172 and lower 178 ends of both hoses 170 by first loosely installing the hoses 170 and clamps 152 at the upper ends 172 to the stack nipples 201, 203, and, then lifting the lower cowling 71 while inserting the lower ends 178 into the donuts 156, gaskets 158, and lower duct flanges 74, 82 on both sides. The final step, after insuring that the hose assemblies 170 have freedom of movement in the vertical direction, is tightening, on both sides, the upper clamp 152 forming a rigid coupling to the engine exhaust stack nipple 201, 203 and the lower nut 164 and bolt 160 fasteners forming a slip joint coupling to the cowling duct flanges 74, 82.

The Stack Tubes

As seen in FIGS. 29, 30 the stack tubes 200 each have a tubular portion 201, 203 at one end forming a nipple extending from the stack wall 182 for coupling to the upper ends 172 of the hose 170 and a scupper portion 202, 207 at the other end for intaking or exhausting engine exhaust gas, respectively. As in the modified prior art system described above the right scupper face 205 is positioned inside the stack 182 for intaking exhaust gas from the engine for delivery through the right stack tube 201 to airframe duct inlet 74 for use in the inlet 77 flow through anti ice system, and the left scupper face 209 is positioned inside the stack 183 for receiving the exhaust gas from airframe duct exit 82 through the left stack tube 203 for delivery to the atmosphere.

The Collar and Braces

As seen in FIGS. 25–28, and 35–38 the present invention optionally includes several further means for strengthening the point of attachment of the stack tubes 200 to the stack walls 182, 183, when appropriate to further prevent cracking of the stacks at the nipple locations.

Figure 25:
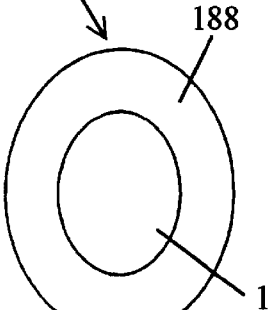
FIG. 25 is a front elevation view of the a first embodiment of the collar of the present invention.
Figure 26:
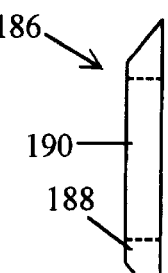
FIG. 26 is a side elevation view of FIG. 25.
Figure 27:
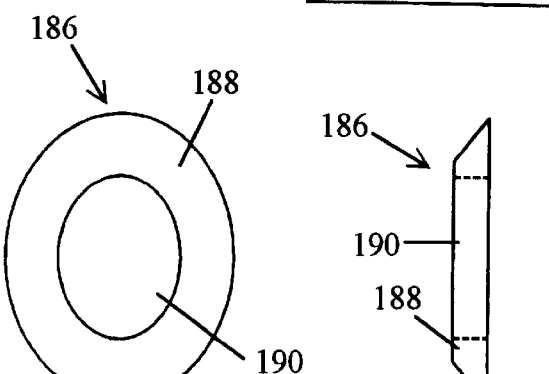
FIG. 27 is a front elevation view of the first embodiment of the brace of the present invention.
Figure 28:
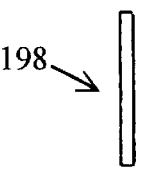
FIG. 28 is a side elevation view of FIG. 27.
Figure 40:
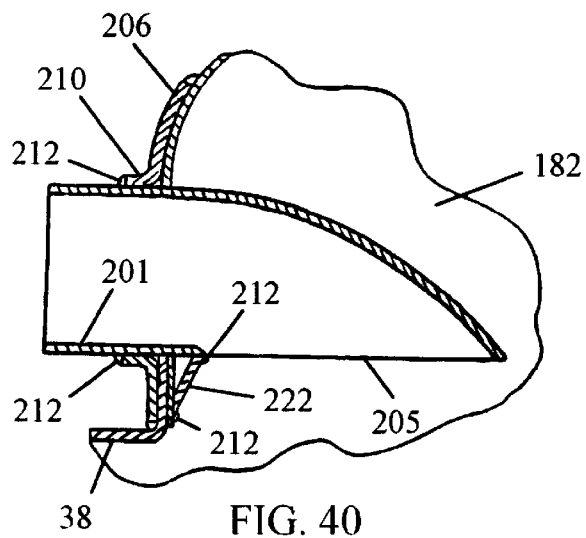
FIG. 40 is a partial top section view like FIG. 31 except showing the right externally mounted collar and internally mounted brace of FIGS. 35–38.
Figure 41:
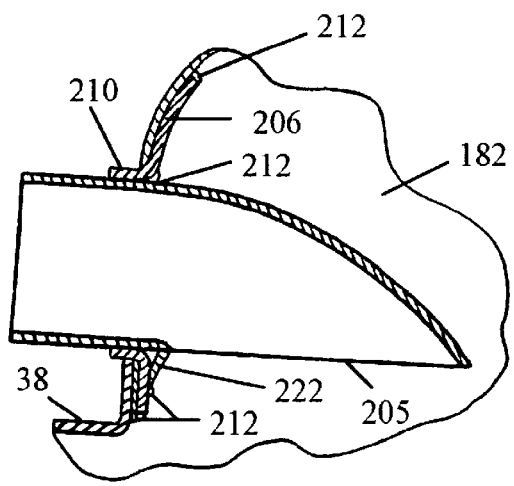
FIG. 41 is a partial top section view like FIG. 31 except showing the right internally mounted collar and internally mounted brace of FIGS. 35–38.

One form of such reinforcement is the collar 186, 187 shown in FIGS. 25, 26, 45 and associated brace 198, 199 shown in FIGS. 27, 28, 45. Collar 186, 187 has an annular concave body portion 188, 189 and central bore 190, 191 for receiving therethrough tubes 201, 203. The body portion 188, 189 is welded to the exterior of the stack wall 182, 183. The brace plate 198, 199 is flat and is mounted between the stack wall 182, 183 and the scupper 202, 207. FIGS. 31, 33, 42, 45, 48.

A second embodiment of such reinforcement is a ring-shaped collar 204, 217 and an associated brace 220 as seen in FIGS. 35–38. The collar 204, 217, also called a doubler, has an annular plate like portion 206, 211, a central bore 208, 219 an axially extending lip 210, 213 adjacent the central bore for receiving the stack tubes 200 therethrough, and a flattened edge 224, 225 for accommodating the welded joint between the stack flange 38, 40 and the stack wall 182, 183 when positioning the collar on the stack, 182, 183. The body portion 206, 211 is contoured to fit the shape of the stack wall exteriorly, as in FIGS. 39, 40, or interiorly, as in FIG. 41, depending on the placement location of the collar and is adapted for permanent attachment, as by welding 212, 215 to the engine stack wall 182, 183 adjacent the point of coupling to the upper end of the hose 170 for reinforcing the structural integrity of the stack wall for further preventing cracking at that location of the stack.

The brace plate 220 is flat and has a radiused recess 222 at one end to match the tube 201, 203 diameter. The brace plate 220 is positioned between the stack 182, 183 and the scupper 202, 207.

Figure 42:
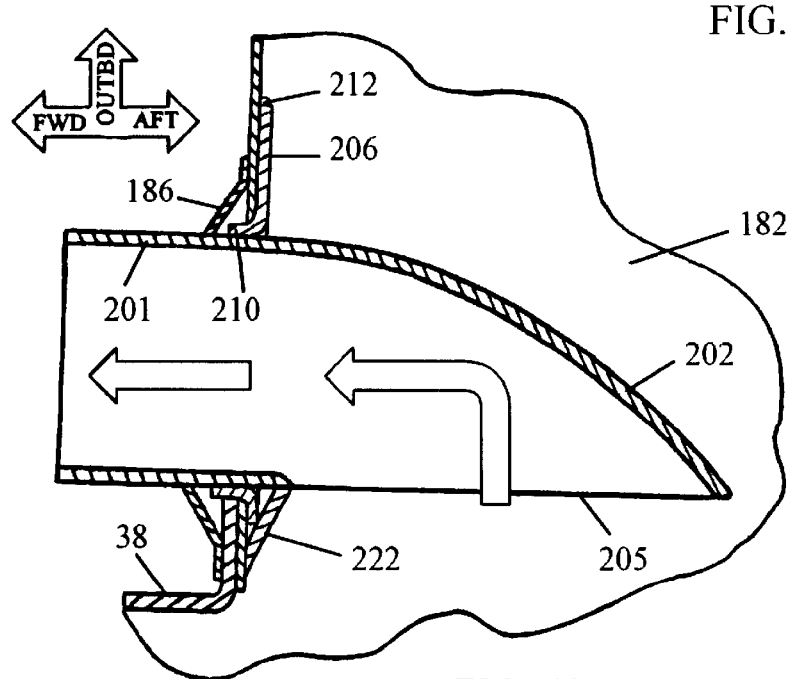
FIG. 42 is a view similar to FIG. 40 except showing a further embodiment of the present invention using both of the collars of FIGS. 25–26 and FIGS. 35–36 simultaneously in combination for further strengthening the point of attachment.
Figure 48:
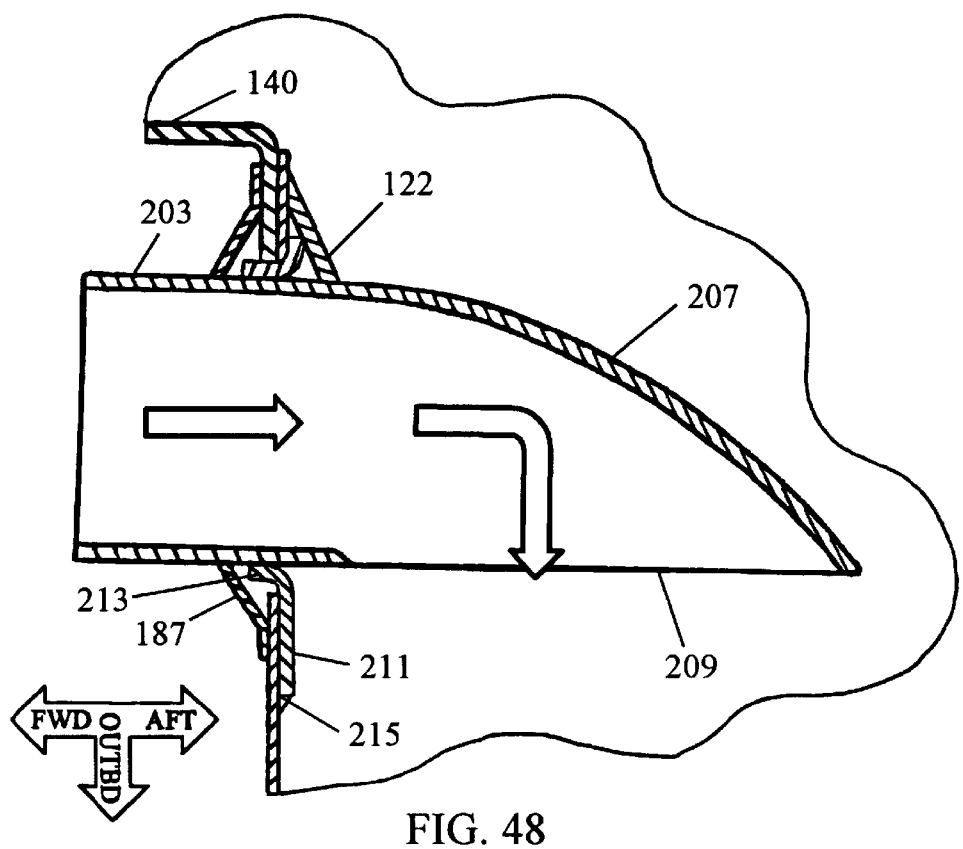
FIG. 48 is a view similar to FIG. 42 except showing the left stack, flange, exit tube, scupper, and a further embodiment of the present invention using both of the collars of FIGS. 25–26 and FIGS. 35–36, as modified for left side installation, simultaneously in combination for further strengthening the point of attachment.
Figure 49:
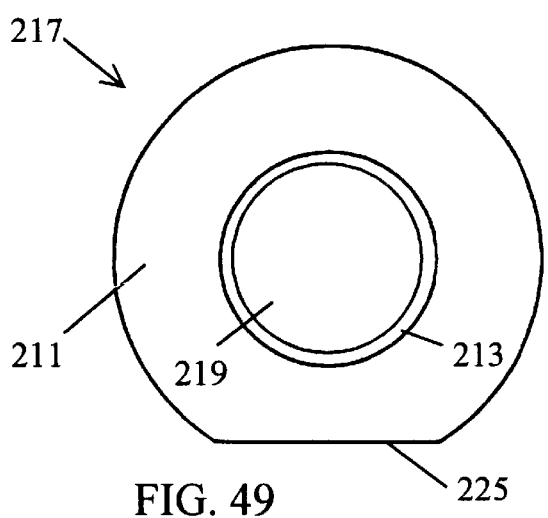
FIGS. 49–50 show the third embodiment of the collar.
Figure 50:
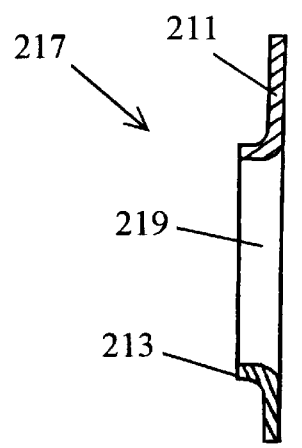

As seen in FIGS. 42, 45 both forms of collars 186, 187 and 204, 217 may be used simultaneously if further reinforcement is required at the point of attachment.

The Assembly Process

In summary it may be seen from the above description that applicant has disclosed a new method for preventing cracks in an aircraft engine stack at or near the stack nipple and scupper.

The steps are evident from the process of assembling the components of the system. The following steps are not intended to set forth any particular sequence since the order of the steps may be changed to accommodate the user.

(1) forming a curved cylindrical tube with straight ends;
(2) radially outwardly convoluting the central portion of the tube to allow axial and lateral flexure of each end relative to a longitudinal axis of the body;
(3) rigidly, sealingly, externally coupling an upper slotted end along one longitudinal axis of the tube over the outside of the engine exhaust stack nipple;
(4) slidingly, sealingly, internally coupling a straight, smooth cylindrical surface portion of the lower end along another longitudinal axis of the tube inside an airframe duct portion.
(5) optionally permanently attaching a collar to an engine stack wall adjacent the point of coupling to the upper end of the tube for reinforcing the structural integrity of the wall for further preventing cracking at that location of the stack; and,
(6) optionally bracing the attachment point internally between the stack wall and a tubular portion of the stack nipple which extends into the interior of the stack.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. In an aircraft hose assembly having
a curved cylindrical body with straight ends,
the body formed with a plurality of radially extending convolutions allowing axial and lateral flexure of each end relative to a longitudinal axis of the body, and
one end constructed and configured for forming a gas tight, rigid coupling to an engine exhaust stack portion,
wherein the improvement comprises
the other end having a straight, smooth, cylindrical, external surface along one longitudinal axis of the body constructed and configured for forming a gas tight, slip joint coupling to an airframe portion.

2. The hose assembly of claim 1 further comprising:
the one end having
a slot extending a predetermined distance from the one end edge axially along another longitudinal axis of the body and
an inside diameter larger than a nipple portion of the stack.

3. The hose assembly of claim 2 further comprising:
a clamp for fastening the one end to the stack nipple.

4. The hose assembly of claim 1 further comprising:
a donut fastener and gasket having a central bore for slidingly receiving and sealingly securing the other end to an airframe duct.

5. The hose assembly of claim 1 wherein an angle formed by the intersection of the respective longitudinal axes is about 70°.

6. The hose assembly of claim 1 wherein the engine exhaust stack portion further comprises:
  at least one tube having
    a nipple end extending from the stack for coupling to the one end of the hose assembly and
    a scupper end for intaking or exhausting engine exhaust gas.

7. The hose assembly of claim 6 wherein the at least one tube further comprises:
  a plurality of identical tubes, one having a scupper face positionable inside the stack for intaking exhaust gas from the engine for delivery through the tube to an airframe duct inlet for secondary use, and the other having a scupper face positionable inside the stack for receiving the exhaust gas from an airframe duct exit through the tube for delivery to the atmosphere.

8. The hose assembly of claim 1 wherein the airframe portion further comprises:
  a heater duct flange inlet or exit.

9. The hose assembly of claim 1 further comprising:
  at least one collar constructed and configured for permanent attachment to an engine stack wall adjacent the point of coupling to the one end of the hose body for reinforcing the structural integrity of the wall for further preventing cracking at that location of the stack.

10. The hose assembly of claim 9 wherein the at least one collar further comprises:
  a body contoured to fit the exterior surface of a stack wall at the point of attachment.

11. The hose assembly of claim 9 wherein the at least one collar further comprises:
  a body contoured to fit the interior surface of a stack wall at the point of attachment.

12. The hose assembly of claim 9 wherein the at least one collar further comprising:
  two collars, one for internal attachment and the other for external attachment. The one for internal attachment having a body contoured to fit the surface of a stack wall at the point of attachment.

13. The hose assembly of claim 9 further comprising:
  a brace plate positionable between the stack and the scupper for strengthening the attachment of the one end of the hose body to the stack.

14. The hose assembly of claim 13 wherein the brace plate further comprises
  a flat body having a radiused recess at one end to match a scupper body shape.

15. The hose assembly of claim 9 wherein the collar further comprises:
  a central bore for receiving a stack nipple therethrough for coupling to the one end of the hose body, and
  the collar surface being concave on the side facing the stack wall.

16. The hose assembly of claim 9 wherein the collar further comprises:
  a ring-shaped body contoured to match a stack wall portion adjacent the point of attachment, and
  an axially extending lip adjacent a central bore for receiving a stack nipple therethrough for coupling to the one end of the hose body.

17. The hose assembly of claim 16 wherein the collar further comprises:
  a flattened edge portion positionable adjacent the point of attachment facing a stack flange.

18. A method of preventing cracks in an aircraft engine stack comprising the steps of:
  forming a curved cylindrical tube with straight ends,
  radially outwardly convoluting the central portion of the tube for allowing axial and lateral flexure of each end relative to a longitudinal axis of the body, and
  rigidly, sealingly, externally coupling one end, which is slotted along one longitudinal axis of the tube, over an engine exhaust stack nipple portion, and
  slidingly, sealingly, internally coupling a straight, smooth cylindrical surface portion of the other end along another longitudinal axis of the tube in an airframe duct portion.

19. The method of claim 18 further comprising the step of:
  permanently attaching a collar to an engine stack wall adjacent the point of coupling to the one end of the hose tube for reinforcing the structural integrity of the wall further for further preventing cracking at that location of the stack.

20. The method of claim 18 further comprising the step of:
  the stack nipple having a tubular portion extending internally of the stack, and
  bracing the point of attachment internally between the stack wall and the internal tubular portion of the stack.

* * * * *